(12) United States Patent
Dunn, Jr. et al.

(10) Patent No.: US 6,639,981 B1
(45) Date of Patent: Oct. 28, 2003

(54) METHODS AND SYSTEMS FOR ROUTING SIGNALING MESSAGES ASSOCIATED WITH PORTED SUBSCRIBERS IN A COMMUNICATIONS NETWORK

(75) Inventors: Randal Latta Dunn, Jr., Cary, NC (US); David Paul Cox, Cary, NC (US); Venkataramaiah Ravishankar, Apex, NC (US); Colleen McGinnis Collard, Holly Springs, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/503,541

(22) Filed: Feb. 14, 2000

Related U.S. Application Data

(60) Provisional application No. 60/127,889, filed on Apr. 5, 1999.

(51) Int. Cl.$^7$ ................................................. H04M 7/00
(52) U.S. Cl. .............................. 379/221.13; 379/221.08
(58) Field of Search ....................... 379/220.01, 221.01, 379/221.13, 201.01, 207.02, 221.09, 221.1, 221.14, 221.08

(56) References Cited

U.S. PATENT DOCUMENTS

| 4,754,479 A | | 6/1988 | Bicknell et al. | |
|---|---|---|---|---|
| 5,457,692 A | * | 10/1995 | Ishinabe et al. | 370/110.1 |
| 5,546,398 A | | 8/1996 | Tucker et al. | |

(List continued on next page.)

FOREIGN PATENT DOCUMENTS

| EP | 1 100 279 A2 | 5/2001 |
|---|---|---|
| WO | WO 97/33441 | 9/1997 |
| WO | WO 00/16583 | 3/2000 |

OTHER PUBLICATIONS

Bellcore, "NetPilot™–STP Interface for Administration of STP–Based Local Number Portability (LNP) Translations", Bellcore Communications Research, SR–4251, Issue 1, pp. 1–239, (Mar. 1997).

(List continued on next page.)

*Primary Examiner*—Creighton Smith
(74) *Attorney, Agent, or Firm*—Jenkins & Wilson, P.A.

(57) ABSTRACT

A routing node for translating and re-directing Signaling System 7 (SS7) messages associated with ported subscribers in a communications network is disclosed. Re-direction or re-routing of signaling message packets is accomplished without the need for explicit local number portability (LNP) type triggers or queries, and as such the routing node of the present invention is considered to implement a triggerless LNP routing solution. Upon entering the routing node, SS7 ISDN User Part (ISUP) type signaling messages that require LNP translation service are encapsulated in an SS7 Signaling Connection Control Part (SCCP) message packet and internally routed within the switch to an LNP translation subsystem. The LNP translation subsystem can be integrated within the routing node or a portion of the LNP translation subsystem can be located on an external database server platform. LNP translation involves the lookup of a called party address in an LNP database, and the return of a Location Routing Number (LRN). The returned LRN, which is representative of the End Office (EO) currently servicing the called party, is inserted into the original ISUP message and the resulting modified message is then routed from the switch.

47 Claims, 10 Drawing Sheets

U.S. PATENT DOCUMENTS

| | | | |
|---|---|---|---|
| 5,550,914 | A | 8/1996 | Clarke et al. |
| 5,572,579 | A | 11/1996 | Orriss et al. |
| 5,583,926 | A | 12/1996 | Venier et al. |
| 5,586,177 | A | 12/1996 | Farriss et al. |
| 5,598,464 | A | 1/1997 | Hess et al. |
| 5,602,909 | A | 2/1997 | Carkner et al. |
| 5,610,977 | A | 3/1997 | Williams et al. |
| 5,625,681 | A | 4/1997 | Butler, II |
| 5,689,555 | A | 11/1997 | Sonnenberg |
| 5,696,816 | A | 12/1997 | Sonnenberg |
| 5,740,239 | A | 4/1998 | Bhagat et al. |
| 5,764,745 | A | 6/1998 | Chan et al. |
| 5,768,358 | A | 6/1998 | Venier et al. |
| 5,771,284 | A | 6/1998 | Sonnenberg |
| 5,796,813 | A | 8/1998 | Sonnenberg |
| 5,949,871 | A | 9/1999 | Kabay et al. |
| 6,009,160 | A | 12/1999 | Sonnenberg |
| 6,021,126 | A | 2/2000 | White et al. |
| 6,108,332 | A | 8/2000 | Kasiviswanathan |
| 6,128,377 | A | 10/2000 | Sonnenberg |
| 6,134,316 | A | 10/2000 | Kallioniemi et al. |
| 6,138,023 | A | 10/2000 | Agarwal et al. |
| 6,272,136 | B1 * | 8/2001 | Lin et al. ............. 370/392 |
| 6,321,268 | B1 * | 11/2001 | Dillon et al. ............. 709/233 |
| 6,424,621 | B1 * | 7/2002 | Ramaswamy et al. ...... 370/230 |
| 6,438,223 | B1 | 8/2002 | Eskafi et al. |
| 6,466,796 | B1 * | 10/2002 | Jacobson et al. ........... 455/456 |
| 6,510,164 | B1 * | 1/2003 | Ramaswamy et al. ...... 370/466 |

OTHER PUBLICATIONS

Anonymous, "Generic Switching and Signaling Requirements for Number Portability," AT&T Network Systems, Issue 1, pp. 1–75, (Feb. 2, 1996).

Rice, Patt, "Local Number Portability," Phone+Magazine, pp. 1–2 (1997).

Vittore, "Enhanced Offerings Shoot for Easy," Telephony, p. 48, 50–51, ( Mar. 8, 1999).

Levine, "Pancaking Portability," American's Network, p. 55–56, ( Oct. 1, 1998).

Smith, "Number Portability Pileup," Telephony, pp. 22, 24, 26, (Jan. 6, 1997).

Anonymous, "Alliances," Communications Week, p. 14–15, ( Apr. 7, 1997).

Engebretson, "Much Ado About Numbers," Telephony, p. 22–24, 26, 28, ( Apr. 7, 1997).

O'Shea, "The Great Seeping Software Takeover," Telephony, p. 32, 36, 38, 42, ( Jun. 30, 1997).

O'Shea, "The Network That's Never Done," Telephony, p. 38, 40, 42–43, ( Sep. 15, 1997).

Snyder, "Testing Portability Possibilities," Telephony, p. 70, ( Nov. 18, 1996).

Anonymous, "Isn't it Ironic . . . ," Supplement to America's Network, p. S5–S7.

Anonymous, "The ABC's of LNP," Supplement to America's Network, p. S3–S4.

Lin et al., "Number Portability for Telecommunication Networks," IEEE, pp. 56–62, (1999).

Chen, "Local Number Portability: Operations Impact and Architecture,"BellSouth Telecommunications, pp. 973–981, (1998).

McGrew, "Transport SS7 Signalling Over IP," Lucent Technologies Inc., pp. 1–8, (1998).

* cited by examiner

| FIELD | N1 | N2 |
|---|---|---|
| OPC | 1-1-0 | 1-1-0 |
| DPC | 3-3-0 | 3-3-0 |
| CgPA:NL | 7 | 7 |
| CgPA:ADD | 9194671234 | 9194671234 |
| CdPA:NL | 7 | 7 |
| CdPA:ADD | 9194605500 | 9193801111 |
| CdPA:NP | 1 | 1 |
| CdPA:NAI | NATIONAL | NATIONAL |
| TCNI | 0 | 1 |
| GAP:ADD | -- | 9194605500 |
| JIP:ID | -- | 919467 |

Figure 10

METHODS AND SYSTEMS FOR ROUTING SIGNALING MESSAGES ASSOCIATED WITH PORTED SUBSCRIBERS IN A COMMUNICATIONS NETWORK

PRIORITY APPLICATION INFORMATION

This application claims the benefit of U.S. Provisional Patent Application No. 60/127,889, filed Apr. 5, 1999, the disclosure of which is incorporated herein by reference in its entirety.

TECHNICAL FIELD

The present invention relates to the routing of signaling messages in a communications network, such as the public switched telephone network (PSTN), or a voice over internet protocol (VOIP) network. More particularly, the present invention relates to methods and systems for routing signaling messages associated with ported subscribers in communications network.

BACKGROUND ART

Local number portability (LNP) gives telephone service subscribers the ability to change local service providers without changing their directory numbers. More specifically, the generic term LNP is actually representative of three basic number porting scenarios: service provider portability which allows subscribers to change local service providers without changing their phone number; service portability, which allows subscribers to change from one type of service to another (e.g., analog to integrated services digital network (ISDN) without changing their phone numbers; and geographic portability, which allows subscribers to move from one physical location to another without changing their phone numbers.

In the current, non-LNP environment, a telephone number performs two basic functions: it identifies the customer, and it provides the network with information necessary to route a call to that customer. Local number portability solutions separate these two functions, thereby providing the means for customers to keep the same directory number when changing local service providers. By separating these two functions, LNP gives customers the flexibility to respond to pricing and service changes offered by rival carriers. Accordingly, it is anticipated that LNP will promote local-exchange competition, which in turn will benefit all customers, as has already been the case with the long-distance market. As LNP solutions are implemented, competition in the local-exchange market is expected to drive down the cost of service, encourage technological innovation, stimulate demand for telecommunications services, and boost economic growth.

A number of interim number-portability methods, such as remote call forwarding and direct inward dialing exist today. However, these methods have several disadvantages: longer call set-up times, increased potential for call blocking, continued reliance on the incumbent local exchange carrier's (LEC's) network, loss of feature functionality, as well as substantial on-going costs to the new local service provider. Among the more long-term LNP solution approaches currently being offered, triggered LNP technology is the most relevant to a discussion of the present invention.

Triggered LNP Solutions

Triggered LNP solutions, as indicated by the name, require that both the "new" and "old" local service providers implement a trigger function in their respective end offices. The "old" service provider switch (often referred to as the donor switch) administers an LNP trigger on the ported subscriber's directory number. When activated, this trigger causes the end office switch to formulate an LNP query that is subsequently launched into the SS7 network. This LNP query is ultimately delivered to an LNP database that contains information related to service provider associated with the dialed number. More particularly, the LNP database performs a lookup based on a portion of the called party dialed digits. A location routing number (LRN) is returned by the LNP database which identifies the end office of the service provider currently serving the called party. The LRN value is then sent back to the end office that originated the LNP query. Upon receipt of the LRN containing message, the originating end office proceeds with call setup and teardown operations using the LRN as a destination address for all subsequent messages associated with the call.

Shown in FIG. 1 is an example of a telecommunications network, generally indicated by the numeral 100, that employs a triggered LNP solution similar to that described above. Telecommunications network 100 includes an originating end office (EO) 110, a recipient terminating EO 112, a donor terminating EO 113, a tandem switching office 114, a signal transfer point (STP) 116, a service control point (SCP) based LNP database 118, a calling party 120, and a called party 122. In this example, it is assumed that called party 122 has had local phone service ported from a service provider that owns EO 113 to a service provider that owns EO 112. Consequently, it is implied that the service responsibility for called party 122 was transferred from the donor EO 113 to the recipient EO 112 at some point in the past. As such, EO 112 is now assumed to service called party 122.

As such, FIG. 1 illustrates a simplified signaling message flow sequence associated with the setup of a call from calling party 120 to called party 122. When calling party 120 goes off-hook and dials the telephone number associated with called party 122, originating EO 110 analyzes the dialed digits and recognizes that the dialed number falls within an exchange that contains ported subscribers. Consequently, the originating EO 110 formulates an LNP query message M1 and sends this query message to the STP 116. Those skilled in the art of SS7 telecommunication networks will appreciate that such LNP queries and responses are typically in the form of Transaction Capabilities Application Part (TCAP) protocol signaling messages. As the TCAP protocol is well known and widely employed in the communication networks presently contemplated, a detailed discussion of the TCAP signaling protocol is not included herein.

Returning now to the message flow shown in FIG. 1, LNP query message M1 is received by the STP 116 and subsequently routed to the SCP-LNP database node 118 as LNP query message M2. The LNP query message M2 is processed by SCP-LNP database node 118, and an LNP response message M3 is formulated and sent back to STP 116. It should be appreciated that LNP response message M3 contains a Location Routing Number (LRN) associated with the recipient EO 112, which is the EO currently servicing Called Party 122. Tandem office 114 is particularly significant from a call setup standpoint, in that a voice trunk connection through tandem 114 will ultimately be required in order to establish a voice circuit with the terminating EO 112 that is currently serving the called party 122. LNP response message M3 is received by the STP 116 and subsequently routed to the originating EO 110, as LNP response message M4. The originating EO 110 processes the LNP response message M4, and uses the LRN information contained therein to formulate and send a call setup message M5. Once again, those skilled in the art of SS7 telecommunication networks will appreciate that such call setup messages are typically of ISDN user part (ISUP) format, and as the ISUP signaling protocol is well known and widely employed in the telecommunications industry, a detailed explanation of this protocol is not provided herein. *Signaling System #7*, by Travis Russell, copyright 1998, McGraw-Hill Publishing, the disclosure of which is incorporated herein by reference in its entirety, provides a detailed explanation of TCAP and ISUP signaling protocols.

Returning to FIG. 1, STP 116 receives message M5 and subsequently message transfer part (MTP) routes the message to tandem office 114 as message M6. Tandem office 114 examines and processes the message and formulates a message M7. Message M7 is sent to STP 116, which in turn MTP routes the message to terminating EO 112 as message M8. Those skilled in the art of telecommunications network operations will appreciate that additional call setup and teardown messages, not shown in FIG. 1, may be necessary to administer a complete a telephone call between the calling party 120 and the called party 122. The signaling message flow shown in FIG. 1 is intended only to generally illustrate a conventional LNP translation process. As these additional signaling messages are not particularly relevant to the design and operation of the present invention, a detailed discussion of call setup and teardown procedures in an SS7 telecommunications network is not provided herein.

While the approach described above is functionally capable of providing network operators with local number portability translation service, this approach necessarily requires that an originating end office switch have the ability to trigger an LNP query and to interpret the subsequent LNP response. In practice, this means that an originating end office switch must be capable of generating and launching an LNP query message into the signaling network. As such, this also implies that an originating end office switch has the ability to receive and process LNP response messages that are generated by service nodes within the signaling network.

Therefore, what is needed is a novel system and method of routing signaling messages to ported subscribers in a communications network that is transparent to the originating end office and, as such, does not require the originating end office signaling facility to directly generate and respond to number portability related signaling messages.

Disclosure of the Invention

According to one aspect, the present invention includes a communications network element that is capable of performing triggerless routing of signaling messages associated with calls to ported subscribers. The triggerless routing node includes a communication module capable of transmitting and receiving data packets over a network. A stop action function processes incoming data packets and subsequently directs certain packets to a number portability database manager. The number portability database manager facilitates searching of a number portability database based on called party information contained within the data packets. Routing information returned by the number portability database is incorporated into the data packets, and the modified data packets are then transmitted into the communications network. Because the routing node examines and directly modifies call setup type signaling messages, no explicit translation service trigger messages are required.

Accordingly, it is an object of the present invention to provide a triggerless number portability routing node capable of modifying the content of call setup type signaling messages associated with calls to ported subscribers, so as to include a Location Routing Number associated with the ported subscriber.

Some of the objects of the invention having been stated hereinabove, other objects will be evident as the description proceeds, when taken in connection with the accompanying drawings as best described hereinbelow.

BRIEF DESCRIPTION OF THE DRAWINGS

FIG. 10 is a table which illustrates partial content of a signaling message received and processed by a triggerless number portability routing node of the present invention.

DETAILED DESCRIPTION OF THE INVENTION

According to one embodiment of the present invention, a triggerless number portability routing node is provided. The triggerless number portability routing node is described and illustrated herein as a collection of processes and subsystems that execute on cards to perform triggerless number portability processing. It is understood that these cards each may include one or more general purpose microprocessors and memory devices. Accordingly, the processes, databases, applications, and subsystems described herein may be implemented by computer-executable instructions embodied in a computer-readable medium. Alternatively, the processes, databases, applications, and subsystems described herein may be implemented in hardware as application-specific integrated circuits (ASICs). Any combination of hardware, software, or hardware and software for performing triggerless number portability processing as described herein is intended to be within the scope of the invention.

A preferred system for implementing triggerless number portability functions will be explained in the context of a number portability routing node. Many of the processes, databases, applications, and subsystems that execute within the number portability routing node are referred to herein as local number portability (LNP) processes, databases, applications, and subsystems. It is understood that the functionality implemented by these LNP entities applies to number portability in general, including, local number, mobile number portability, and any other porting of subscriber numbers. Accordingly, the present invention is not intended to be limited to providing only triggerless local number portability.

Figure 2:
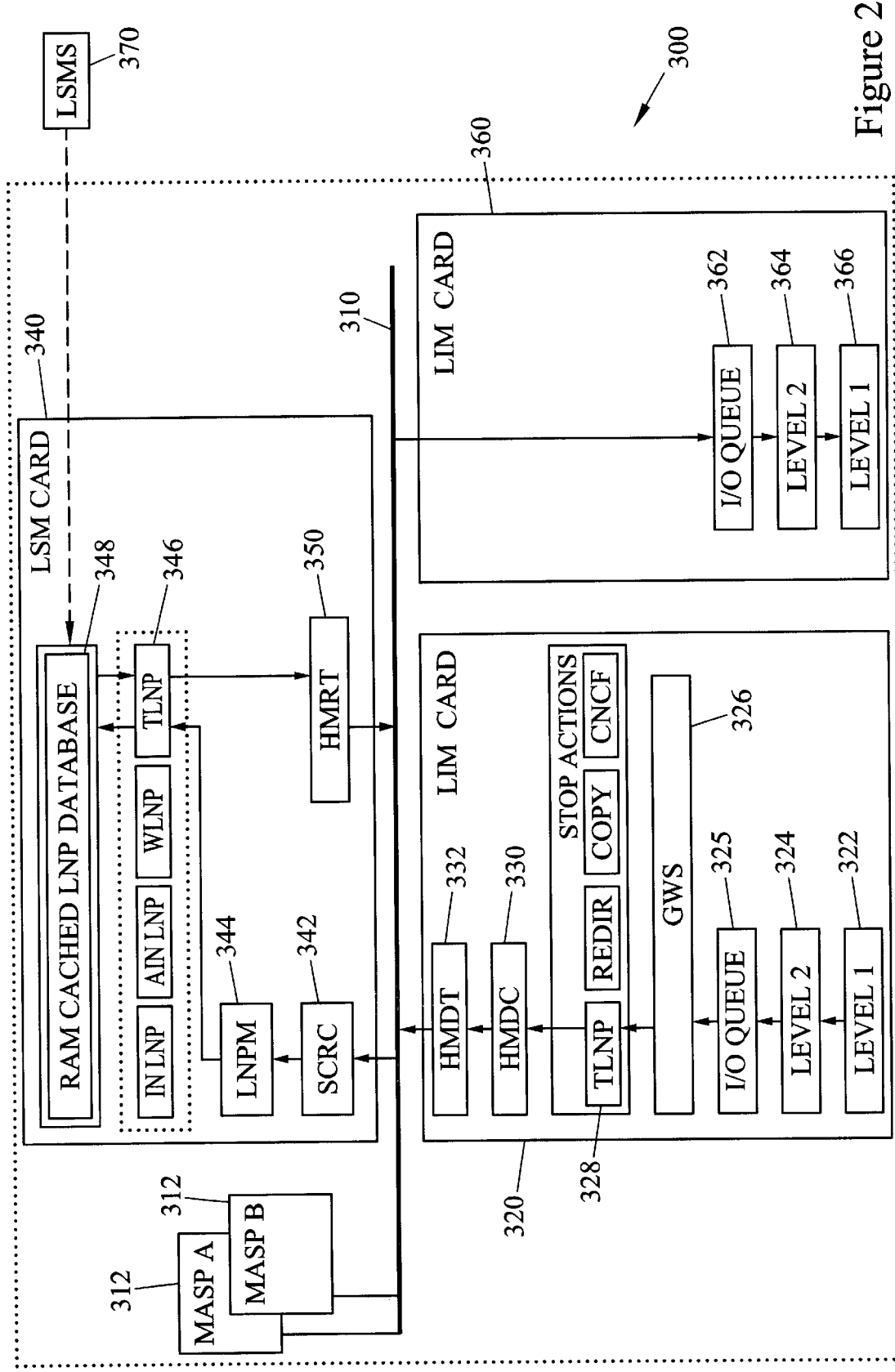
FIG. 2 is a schematic diagram of a system architecture according to a preferred embodiment of a triggerless number portability routing node of the present invention.
Figure 3:
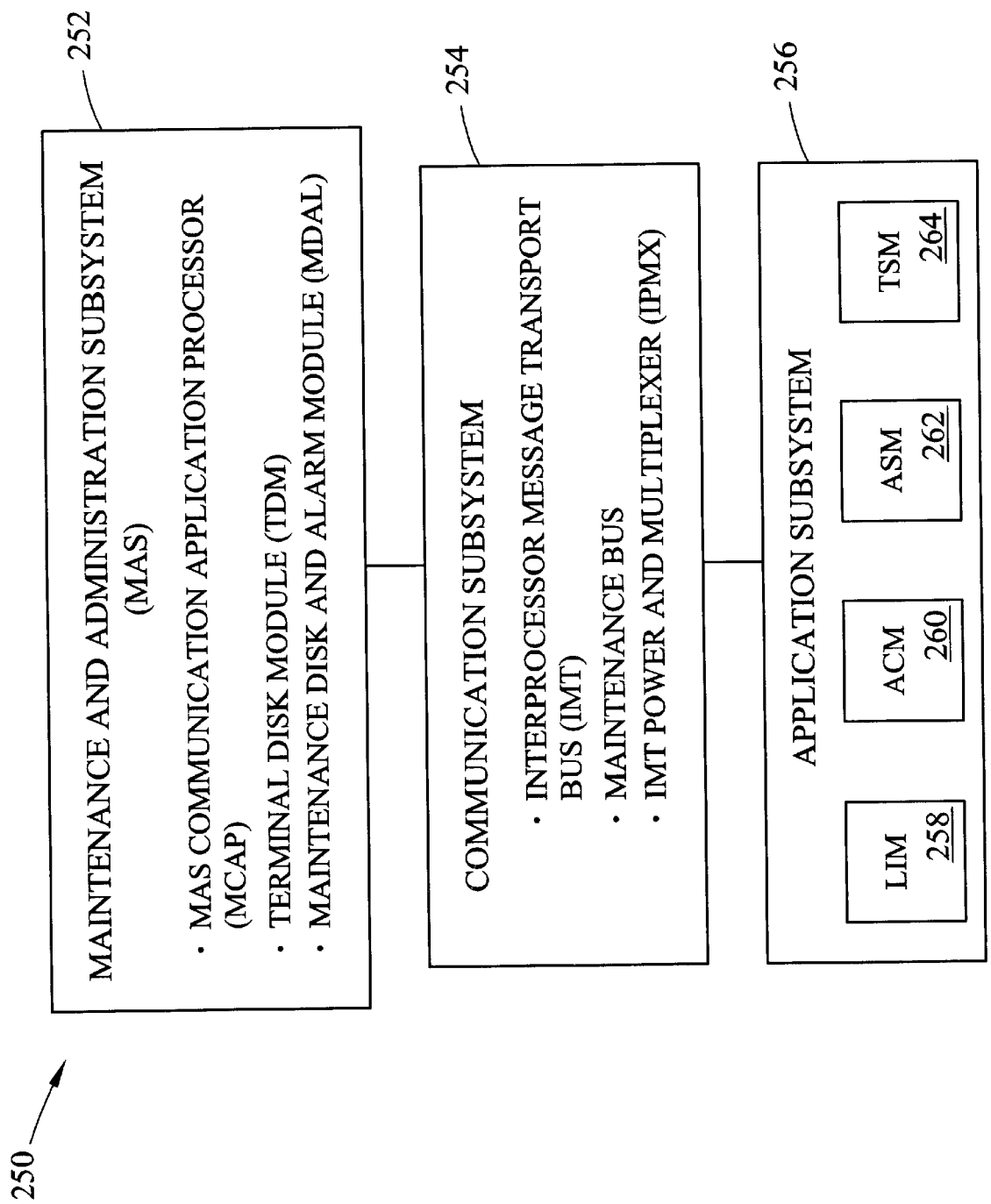
FIG. 3 is a schematic diagram of a conventional signal transfer point switching node with integral number portability database functionality for use in a triggered number portability network architecture.

Shown in FIG. 2 is a schematic diagram of a triggerless number portability routing node 300 of the present invention. In the preferred embodiment shown, triggerless number portability routing node 300 employs an internal architecture similar to that of high performance STP and signaling gateway (SG) products which are marketed by the assignee of the present application as the Eagle® STP and IP7 Secure Gateway™, respectively. A block diagram that generally illustrates the base internal architecture of the Eagle® STP product is shown in FIG. 3. A detailed description of the Eagle® STP may be found in the *Eagle® Feature Guide* PN/910-1225-01, Rev. B, January 1998, published by Tekelec, Inc. the disclosure of which is hereby incorporated herein by reference in its entirety. Similarly, a detailed description of the IP$^7$ Secure Gateway™ may be found in Tekelec, Inc. publication PN/909-0767-01, Rev B, August 1999, titled *Feature Notice IP$^7$ Secure Gateway™ Release 1.0*, the disclosure of which is hereby incorporated herein by reference in its entirety.

As described in the above-referenced *Eagle® Feature Guide*, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including: a Link Interface Module (LIM) 258 that provides SS7 links and X.25 links, a Application Communication Module (ACM) 260 that provides a TCP/IP interface over Ethernet, and an Application Service Module (ASM) 262 that provides global title translation, gateway screening and other services. A Translation Service Module (TSM) 264 may also be provided to support triggered local number portability service. Once again, a detailed description of the Eagle® STP is provided in the above cited *Eagle® Feature Guide* and need not be described in detail herein. It should also be appreciated that, in addition to conventional SS7 LIM cards, a Database Communication Module (DCM) can be employed in a similar manner to provide for the transport of Internet Protocol (IP) encapsulated SS7 messages over an IP network, as described in the above referenced *Feature Notice IP$^7$ Secure Gateway™ Release 1.0* publication. With particular regard to the TSM triggered LNP services module mentioned above, a detailed description of the Tekelec, Inc. triggered LNP solution may be found in the *Feature Guide LNP LSMS* PN/910-1598-01, Rev. A, January 1998, published by Tekelec, Inc., the disclosure of which is hereby incorporated herein by reference in its entirety.

Integrated Number Portability Database Embodiment

Referring again to FIG. 2, it will be appreciated that triggerless number portability routing node 300 includes a high speed Interprocessor Message Transport (IMT) communications bus 310. Communicatively coupled to IMT bus 310 are a number of distributed processing modules or cards including: a pair of Maintenance and Administration Subsystem Processors (MASPs) 312; a pair of SS7 capable Link Interface Modules (LIMs) 320 and 360; and an LNP Service Module (LSM) 340. These modules are physically connected to the IMT bus 310 such that signaling and other type messages may be routed internally between all active cards or modules. For simplicity of illustration, only a single pair of LIMs 320 and 360 and a single LSM 322 are included in FIG. 2. However, it should be appreciated that the distributed, multi-processor architecture of the triggerless number portability routing node 300 facilitates the deployment of multiple LIM, LSM, and other cards, all of which could be simultaneously connected to the IMT bus 310.

MASP pair 312 implement the maintenance and administration subsystem functions described above. As the MASP pair 312 are not particularly relevant to a discussion of the flexible routing attributes of the present invention, a detailed discussion of their function is not provided herein. For a comprehensive discussion of additional MASP operations and functionality, the above-referenced Tekelec, Inc. publications can be consulted.

Focusing now on LIM card functionality, it will be appreciated that LIM 320 is comprised of a number of sub-component processes including, but not limited to an SS7 MTP level 1 process 322, an SS7 MTP level 2 process 324, an I/O buffer or queue 325, a gateway screening (GWS) process 326, a triggerless LNP (TLNP) stop action process 328, an SS7 MTP level 3 layer HMDC process 330, and an HMDT process 332. MTP level 1 and 2 processes 322 and 324, respectively, provide the facilities necessary to send and receive digital data over a particular physical media/physical interface, as well as to provide error detection/correction and sequenced delivery of all SS7 message packets. I/O queue 325 provides for temporary buffering of incoming and outgoing signaling message packets. GWS process 326 is responsible for examining the incoming signaling message and determining which, if any, of the provisioned stop actions are applicable. TLNP stop action process 328 is responsible for encapsulating an incoming SS7 ISUP Initial Address Message (IAM) signaling message packet within an SS7 Signaling Connection Control Part (SCCP) formatted packet. MTP level 3 HMDC process 330 receives signaling messages from the lower processing layers and performs a discrimination function, effectively determining whether an incoming SS7 message packet requires internal processing or is simply to be through switched. The HMDT process 332 handles the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

As such, it will be appreciated that the three functional processes associated with LIM 360 shown in FIG. 2 are simply those processes that are relevant to a discussion of out-bound LIM operation in the examples of triggerless number portability routing node operation disclosed herein. The processes explicitly shown on the out-bound LIM 360 include an I/O queue 362 and MTP level 1 and 2 processes 366 and 364, respectively. I/O queue 362 facilitates temporary buffering of incoming and outgoing signaling message packets. MTP level 2 process 364 and an MTP level 1 process 366, respectively, provide the facilities necessary to send and receive digital data over a particular physical media/physical interface, as well as to provide error detection/correction and sequenced delivery of all SS7 message packets.

In general, an LSM card includes the database and database control processes necessary to achieve the triggerless number portability routing functionality of the present invention. The LSM 340 shown in FIG. 2 is comprised, in part, of an SCCP subsystem controller known as a Signaling Connection Routing Controller (SCRC) process 342, a Local Number Portability Manager (LNPM) process 344, a Triggerless Local Number Portability (TLNP) application 346, and an LNP database process 348. The SCRC process 342 is responsible for discrimination of signaling messages at the SCCP level, and for distributing the signaling messages to a higher processing level when appropriate. In the configuration shown in FIG. 2, the next highest processing level is represented by the LNPM process 344. LNPM process 344 is responsible for determining which specific local number portability application is required for successful processing of a particular incoming signaling message packet. As will be appreciated from FIG. 2, a number of local number portability applications may be simultaneously provisioned on a single LSM card.

Figure 4:
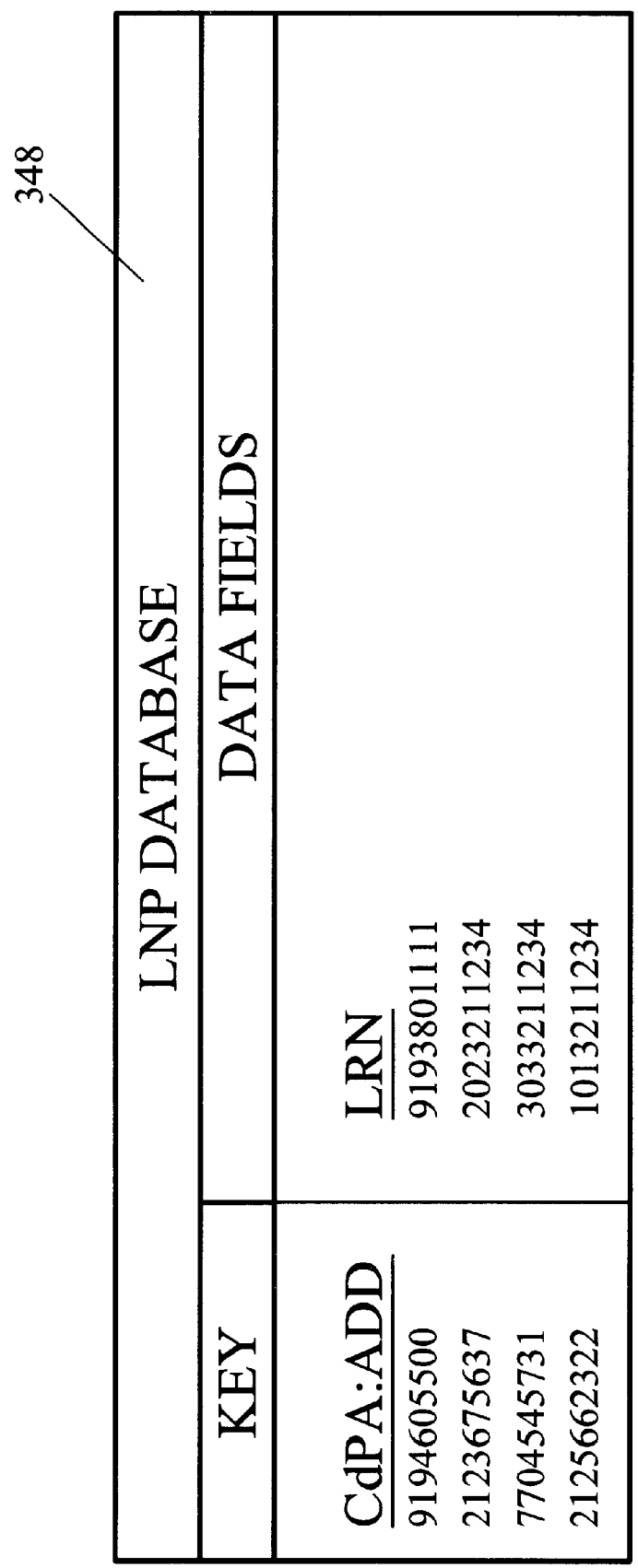
FIG. 4 is a is a table which illustrates a sample number portability database structure and data used in a preferred embodiment of a triggerless number portability routing node of the present invention.

While any number or variety of LNP translation applications may be provisioned on a single LSM card, triggerless local number portability (TLNP) application 346 is the most relevant to a general discussion of the present invention. TLNP application 346 essentially contains the logic necessary to de-capsulate the original ISUP IAM message, extract the appropriate information from the de-capsulated message, and perform an associated LNP database lookup. Furthermore, TLNP application 346 is responsible for modifying the signaling message based on the results of the LNP database lookup. In the embodiment shown in FIG. 2, an LNP database 348 is co-resident on the LSM card 340. More particularly, in this embodiment of the present invention, the LNP database 348 is stored in one or more blocks of high speed random access memory (RAM) that is located on the LSM card. As indicated in FIG. 4, LNP database 348 is comprised of a number of entries or records, with each record containing at least two fields; a CdPA Address (CdPA:ADD) field, and a Location Routing Number (LRN) field. Once again, it will be appreciated from the discussion above that an LRN identifies the end office of the service provider currently serving the called party.

Referring again to FIG. 2, LSM 340 also contains an HMRT process 350 that is responsible for the routing of SS7 message packets once TLNP translation has been completed. That is, the HMRT process 350 determines to which LIM card an SS7 message packet should be routed for subsequent outbound transmission into the communication network.

It will be appreciated from FIG. 2 that LSM 340 is in communication with and serviced by a Local Service Management System (LSMS) 370. In general, an LSMS system is also in communication with a Number Portability Administration Center (NPAC). As such, an LSMS acts as the interface between carrier networks and the NPAC. In a typical implementation, an LSMS receives and stores ported subscriber information from the NPAC and then, in turn, is responsible for downloading this ported subscriber information to all the LNP databases which it services. As the interaction between an NPAC and an LSMS is not particularly relevant to the present invention, a detailed discussion of such NPAC-LSMS system functionality will not be presented herein. It should suffice to state that the LSMS 370 maintains the LNP database 348 with the most current ported subscriber information available at any given time.

Integrated Number Portability Database Translation Process

Figure 5:
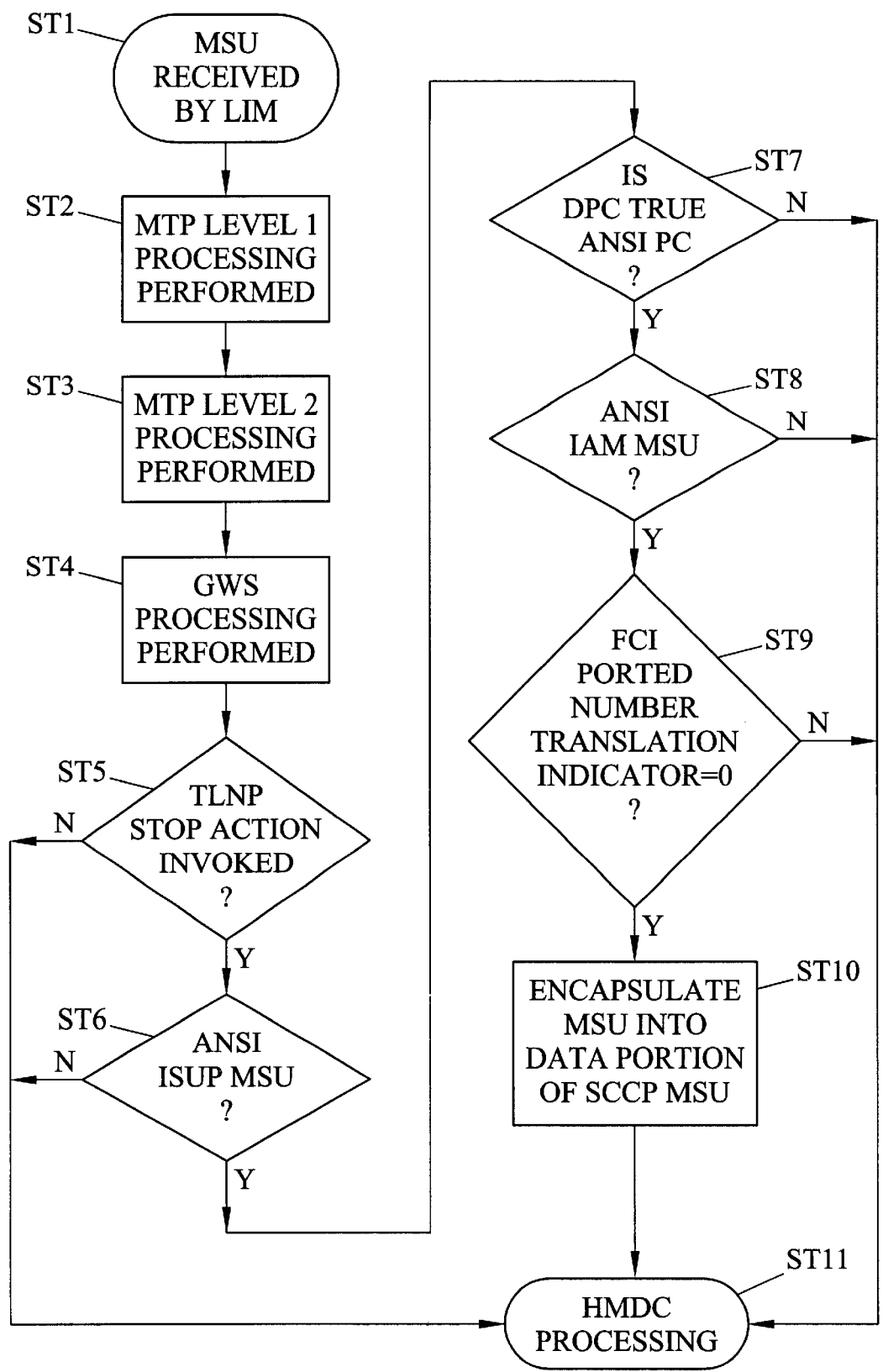
FIG. 5 is a flow chart illustrating SCCP encapsulation related processing of a signaling message according to a preferred embodiment of a triggerless number portability routing node of the present invention.
Figure 6:
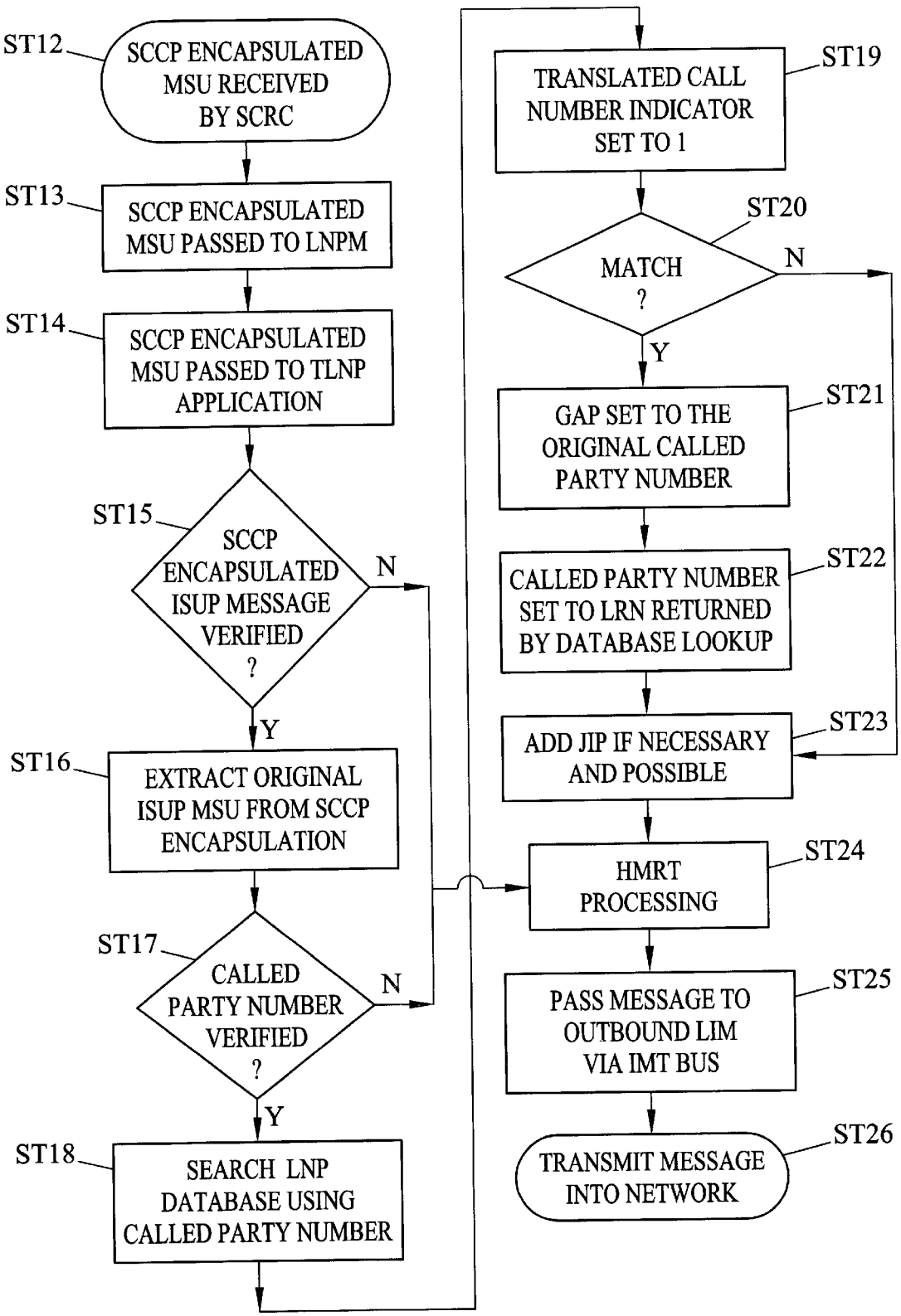
FIG. 6 is a flow chart illustrating SCCP de-capsulation and number portability translation related processing of a signaling message according to a preferred embodiment of a triggerless number portability routing node of the present invention.

Continuing with FIG. 2, the path of a typical SS7 ISUP IAM signaling message requiring TLNP translation service is traced from reception at the triggerless number portability routing node by the inbound LIM 320, through the translation process, and on to the outbound LIM 360. A detailed flow chart of triggerless number portability related processing steps is presented in FIGS. 5 and 6, and may be used in conjunction with the schematic diagram shown in FIG. 2 to better understand the triggerless LNP lookup methodology.

Beginning with step ST1, an incoming ISUP IAM message is received at the inbound LIM module 320. In steps ST2 and ST3, the incoming ISUP IAM message is received and processed by the MTP Level 1 and 2 processes 322 and 324, respectively. As stated above, MTP level 1 and 2 processing includes correction, sequencing, and communicating with network error communications hardware. With MTP Level 1 and 2 processing complete, the signaling message packet is temporarily buffered in the I/O queue 325 before being passed up the stack to the MTP Level 3 Gateway Screening (GWS) process 326. As indicated in step ST4, GWS process 326 examines the incoming ISUP IAM message and determines not only whether the message is to be allowed into the switch for further processing, but also which, if any, of the provisioned stop actions are applicable to the incoming message. In this example, GWS process 326 examines the incoming ISUP IAM message and determines that the message is permitted to enter the switch. Furthermore, upon examination of the Originating Point Code (OPC), Destination Point Code (DPC) and Service Indicator Octet (SIO) fields contained in the MTP routing layer, it is determined that the message requires additional processing by the TLNP stop action 328 (ST5).

Figure 7:
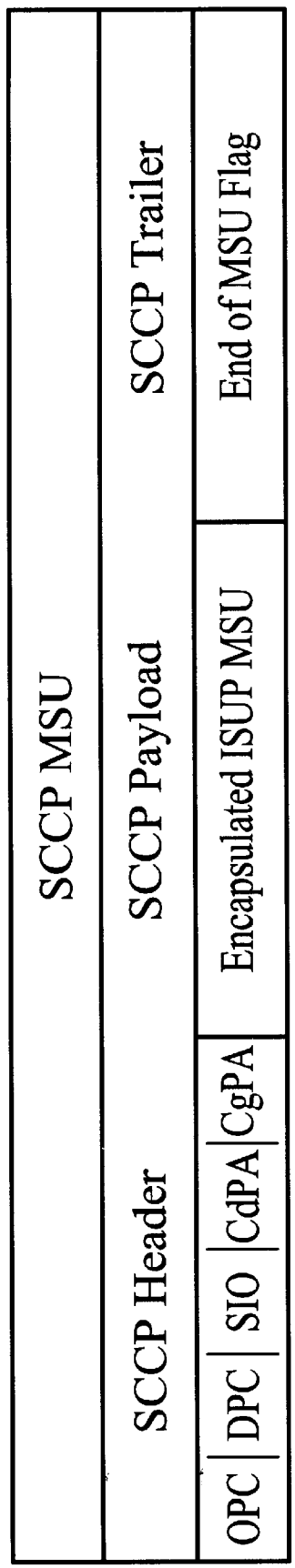
FIG. 7 is a diagram illustrating an SCCP encapsulated ISUP signaling message.

In step ST6 TLNP stop action process 328 receives the ISUP IAM message from GWS process 326 and determines that the incoming message is an ISUP type MSU. The TLNP stop action process 328 next checks the DPC of the incoming MSU. More specifically, the TLNP stop action verifies that the DPC of the incoming MSU is a valid PC, as indicated in step ST7. In steps ST8 and ST9, TLNP stop action 328 examines the incoming MSU to determine whether LNP service is required. If the incoming MSU is identified as being an ISUP IAM type message (ST8) and the FCI Ported Number Translation Indicator is equal to zero (ST9), TLNP stop action 328 encapsulates the ISUP IAM message within an SCCP formatted MSU, as indicated in step ST10. Such SCCP encapsulation is effectively achieved by adding essential SCCP message leading and trailing bit sequences to the base bit sequence that comprises the ISUP IAM MSU, as generally illustrated in FIG. 7. Thus, an SCCP type encapsulating MSU is created which envelops or contains an ISUP type MSU. Subsequent to this encapsulation, the incoming message no longer appears or is treated as an ISUP IAM message within the TLNP routing node 300, but is instead processed internally as an SCCP type SS7 message.

It should be appreciated that during the encapsulation process, the SCCP MSU destination point code (DPC) field value is set to the point code (PC) of the TLNP routing node, the SCCP MSU Called Party Routing Indicator (CdPA RI) field is set to subsystem number (SSN), and the SCCP MSU Called Party Subsystem Number (CdPA SSN) field is set to the LNP SSN of the TLNP routing node. It should also be appreciated that failure of the incoming ISUP MSU to meet the criteria specified in steps ST5 through ST9 causes the original, non-encapsulated MSU to be routed directly to HMDC process 330 where normal ISUP MSU type routing is resumed.

However, in the case where an incoming ISUP MSU satisfies the ST5 through ST9 criteria, SCCP encapsulation of the ISUP MSU occurs and the resulting encapsulated MSU is directed to HMDC process 330, where SCCP type processing is performed. In the example shown in FIG. 2, HMDC process 330 examines the message packet and determines that the DPC of the packet is the PC of the TLNP routing node. Consequently, further processing of the SCCP MSU within the TLNP routing node is assumed to be necessary, and the packet is passed to the HMDT process 332. The HMDT process 332 examines the Service Indicator (SI) field of the encapsulated MSU, which indicates that the encapsulated packet is of an SCCP type. As such, HMDT process 332 places the encapsulated SCCP MSU on high speed IMT bus 310 for transport to LSM 340 and subsequent LNP translation.

In step ST12, the encapsulated SCCP MSU is received and examined by SCRC process 342 that is resident on LSM 340. Given that the CdPA RI field of the SCCP MSU is set to SSN and the CdPA SSN field of the SCCP MSU is set to the LNP subsystem of the TLNP node 300, SCRC process 342 forwards the encapsulated MSU to the LNPM process 344, as indicated by step ST13. In step ST14, LNPM process 344 verifies that the SCCP MSU contains an encapsulated ISUP MSU. Upon successful verification, the SCCP MSU is sent to TLNP application 346 for further processing. TLNP application processing begins with verification of the pointers and field lengths associated with the ISUP message (ST15). With a positive verification at step ST15, TLNP application 346 next extracts the original ISUP MSU by removing and discarding the SCCP wrapper (ST16). The TLNP application 346 next performs a number of operations intended to validate one or more of the Called Party (CdPA) parameters contained in the original ISUP MSU (ST17). Such validation operations may include, but are not limited to: verification that the Called Party Number exists; verification that the Called Party Number contains 10 digits; verification that the Nature Of Address is national; and verification that the Numbering Plan is ISDN.

With the above described validation process successfully completed, the TLNP application 346 extracts the Called Party Number from the ISUP IAM MSU and uses this value to perform a lookup operation in LNP database 348 (ST18). As indicated in step ST19, the Translated Call Number Indicator (TCNI) field contained within the ISUP IAM message is set to a value of one. It should be appreciated that the TCNI field is set to a value of one regardless of whether a match is found during the LNP lookup operation. In the event that an entry exists in the LNP database 348 which corresponds to the Called Party Number value in the ISUP IAM message, the Called Party Number is considered to be associated with a ported subscriber (ST20) and LNP database process 348 returns a Location Routing Number (LRN). Prior to incorporation of the LRN value in the ISUP MSU, the original CdPA Number value used in the LNP database lookup is stored in a Generic Address Parameter (GAP) field, which is also contained within the ISUP MSU (ST21). Subsequently, the CdPA Number field of the ISUP MSU is overwritten with the LRN value returned by the LNP database process 348, as indicated in step ST22.

As further indicated in step ST23, a value known as a Jurisdiction Information Parameter (JIP) may be appended to the TLNP processed ISUP MSU under certain conditions. The JIP is used in LNP type applications to support billing systems. Such telecommunication billing systems might otherwise have difficulty determining the correct billing for an originating number that has been ported. As such, a valid JIP contains a value that represents the origin of the call. The value may be some of the digits from the calling party address or, alternatively, an identifier associated with the end office that originated the call. A service provider may negotiate to use a single JIP to represent all messages from its own network, or a service provider may chose to provide a list of the exchanges in its network that can be used as the JIP value. In the TLNP routing node 300 shown in FIG. 2, a JIP parameter may be added to the ISUP IAM message by TLNP process 346 if a JIP does not already exist in the original MSU and a JIP value is provisioned in LNP database 348. A JIP parameter may also be added by TLNP process 346 if the original IAM MSU contains a valid Calling Party (CgPA) Number but does not already contain a JIP value.

With TLNP processing complete, the modified ISUP MSU is passed to HMRT process 350. HMRT process 350 determines to which LIM card an SS7 message packet should be routed for subsequent outbound transmission. In this case, the HMRT process 350 determines that the desired outbound signaling link associated with the routing of the modified ISUP MSU is located on LIM 360. Consequently, the modified signaling message packet is internally routed across the IMT bus 310 to LIM 360, where it is generally received by the I/O queue process 362. Eventually, the modified message packet is passed from the I/O queue 362 on to the MTP Level 2 and Level 1 processes 364 and 366, respectively. Once again, MTP level 1 and 2 layer processes 366 and 364, respectively, provide the facilities necessary to send and receive digital data over a particular physical media/physical interface, as well as to provide error detection/correction and sequenced delivery of all SS7 message packets transmitted into the SS7 network.

External LNP Database Server Embodiment

Figure 8:
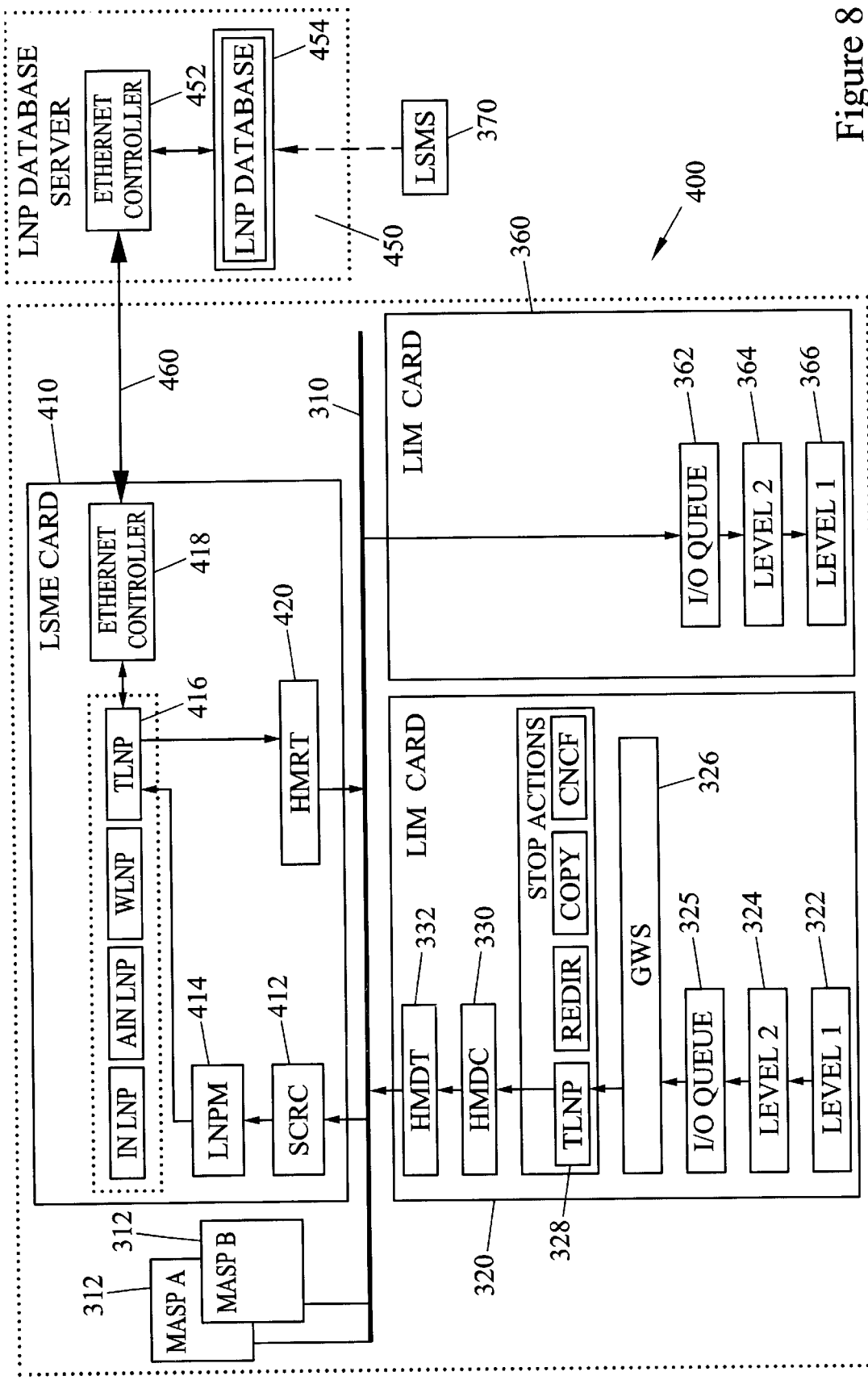
FIG. 8 is a schematic diagram of a system architecture according to another embodiment of a triggerless number portability routing node of the present invention.

Another embodiment of the present invention is shown in FIG. 8. Included in this embodiment is a triggerless LNP routing node 400, which is further comprised of a pair of LIM modules 320 and 360, a pair of MASP processors 312, an IMT communication bus 310. Also included in the embodiment shown in FIG. 8 is an LSMS 370. The above mentioned components are essentially identical in function to the corresponding components previously described for the embodiment shown in FIG. 2. Consequently, a detailed description of these system components is not repeated in the discussion that follows.

It will be appreciated that the LSM card 340 of the previously described embodiment is replaced by an LSME card 410 and an external LNP database server 450. From an operational perspective, LSME module 410 and external LNP database server 450 provide essentially the same functionality as the integrated LSM module 340, previously described above and shown in FIG. 2.

LSME module 410, shown in FIG. 8 is comprised, in part, of an SCCP subsystem controller known as a Signaling Connection Routing Controller (SCRC) process 412. The SCRC process 412 is responsible for discrimination of signaling messages at the SCCP level, and for distributing the signaling messages to a higher processing level when appropriate. In the configuration shown in FIG. 8, the next highest processing level is represented by a Local Number Portability Manager (LNPM) process 414. LNPM process 414 is responsible for determining which specific Local Number Portability application is required for successful processing of a particular incoming signaling message packet. While any number or variety of LNP translation applications may be simultaneously provisioned on a single LSME card, the triggerless local number portability (TLNP) application 416 is the most relevant to a general discussion of the present invention. TLNP application 416 essentially contains the logic necessary to de-capsulate the original ISUP IAM message, extract the appropriate information from the de-capsulated message, and perform an associated LNP database lookup. Furthermore, the TLNP application 416 is responsible for modifying the signaling message based on the results of the LNP database lookup.

In the embodiment shown in FIG. 8, TLNP application process 416 is also interfaced to an Ethernet Controller process 418, and as such is also responsible for directing incoming message packets to process 418. Ethernet Controller process 418 serves as an internal Ethernet terminus that services and administers connection, via an Ethernet communication link 460, to the external LNP database server 450. Correspondingly, the external LNP database server 450 includes an Ethernet Controller process 452, which serves as an external Ethernet terminus that services and administers connection to the triggerless LNP routing node 400, via the Ethernet communication link 460.

As shown in FIG. 8, an LNP database 454 is stored within and administered by the LNP database server 450. Such an LNP database server could be configured such that some or all of the LNP data is stored in blocks of high speed random access memory (RAM), or the LNP data could be stored on a high density, fast access physical storage media such as magnetic or optical discs.

LSME 410 also contains an HMRT process 420 that is responsible for the routing of SS7 message packets once TLNP translation has been completed. That is, the HMRT process 420 determines to which LIM card an SS7 message packet should be routed for subsequent outbound transmission.

It will be appreciated from FIG. 8 that in the case of an external LNP database server configuration, the server 450 is in communication with and serviced by the Local Service Management System (LSMS) 370, in a manner similar to that described previously. Once again, it should suffice to state that the LSMS 370 maintains the LNP database server 454 with the most current ported subscriber information available at any given time.

Ethernet Connected LNP Database Server Translation Process

Referring again to FIG. 8, the path of a typical SS7 ISUP IAM signaling message requiring TLNP translation service is next traced from reception at the triggerless LNP routing node by the inbound LIM 320, through the translation process, and on to the outbound LIM 360. Once again, a detailed flow chart of TLNP related processing steps is presented in FIGS. 5 and 6, and may be used in conjunction with the schematic diagram shown in FIG. 8 to better understand the triggerless LNP lookup methodology.

As processing steps ST1 through ST11 are essentially identical to those discussed and described above for the embodiment shown in FIG. 2, a detailed discussion of these steps will not be repeated below. Instead, it will be appreciated that an incoming ISUP IAM MSU is received by LIM card 320 and, according to the process described in steps ST1 through ST11, the ISUP MSU is SCCP encapsulated and internally routed via IMT bus 310 to LSME card 410 for final TLNP processing.

Beginning with step ST12, the encapsulated SCCP MSU is received and examined by SCRC process 412 that is resident on LSME 410. Given that the CdPA RI field of the SCCP MSU is set to SSN and the CdPA SSN field of the SCCP MSU is set to the LNP subsystem of the TLNP node 400, SCRC process 412 forwards the encapsulated MSU to the LNPM process 414, as indicated by step ST13. In step ST14, LNPM process 414 verifies that the SCCP MSU contains an encapsulated ISUP MSU. Upon successful verification, the SCCP MSU is sent to TLNP application 416 for further processing. TLNP application processing begins with verification of the pointers and field lengths associated with the ISUP message (ST15). With a positive verification at step ST15, TLNP application 416 next extracts the original ISUP MSU by removing and discarding the SCCP wrapper (ST16). The TLNP application 416 next performs a number of operations intended to validate one or more of the Called Party (CdPA) parameters contained in the original ISUP MSU (ST17). Such validation operations may include, but are not limited to: verification that the Called Party Number exists; verification that the Called Party Number contains 10 digits; verification that the Nature Of Address is national; and verification that the Numbering Plan is ISDN.

With the above-described validation process successfully completed, the TLNP application 416 extracts the Called Party Number from the ISUP IAM MSU and uses this value to perform a lookup operation in LNP database 454 (ST18). In the present embodiment, it will be appreciated that the LNP database query requested by TLNP process 416 is communicated to the LNP database 454 via the high speed Ethernet type communication link 460. More particularly, TLNP process 416 communicates directly with the on-board Ethernet controller process 418 which facilitates access to the Ethernet communication link 460. The LNP database query communication is received by the external LNP database server 450, and subsequently LNP database 454, via Ethernet controller 452. It will be appreciated that a similar process, in reverse, is performed when LNP database response messages are communicated from the external LNP database server 450 to the LSME card 410. It should also be appreciated that TLNP processing node 400 of the present invention is not limited to the use of an Ethernet connection between the external LNP database server and the LSME card 410. Any number of commercially available, high-speed communication links and protocols could be easily implemented to provide the required inter-device communication functionality.

As indicated in step ST19, the Translated Call Number Indicator (TCNI) field contained within the ISUP IAM message is set to a value of one. It should be appreciated that the TCNI field is set to a value of one regardless of whether a match is found during the LNP lookup operation. In the event that an entry exists in the LNP database 454 which corresponds to the Called Party Number value in the ISUP IAM message, the Called Party Number is considered to be associated with a ported subscriber (ST20) and LNP database process 454 returns a Location Routing Number (LRN). Prior to incorporation of the LRN value in the ISUP MSU, the original CdPA Number value used in the LNP database lookup is stored in a Generic Address Parameter (GAP) field, which is also contained within the ISUP MSU (ST21). Subsequently, the CdPA Number field of the ISUP MSU is overwritten with the LRN value returned by the LNP database process 454, as indicated in step ST22.

As further indicated in step ST23, a Jurisdiction Information Parameter (JIP) may be appended to the TLNP processed ISUP MSU under certain conditions. These conditions have been described above, in detail, for the previous embodiment and consequently will not be repeated below. With TLNP processing complete, the modified ISUP MSU is passed to HMRT process 420. HMRT process 420 determines to which LIM card an SS7 message packet should be routed for subsequent outbound transmission. In this case, the HMRT process 420 determines that the desired outbound signaling link associated with the routing of the modified ISUP MSU is located on LIM 360. Consequently, the modified signaling message packet is internally routed across the IMT bus 310 to LIM 360, where it is generally received by the I/O queue process 362. Eventually, the modified message packet is passed from the I/O queue 362 on to the MTP Level 2 and Level 1 processes 364 and 366, respectively. Once again, MTP level 1 and 2 layer processes 366 and 364, respectively, provide the facilities necessary to send and receive digital data over a particular physical media/physical interface, as well as to provide error detection/correction and sequenced delivery of all SS7 message packets transmitted into the SS7 network.

Sample Triggerless LNP Call Setup Message Flow

Figure 9:
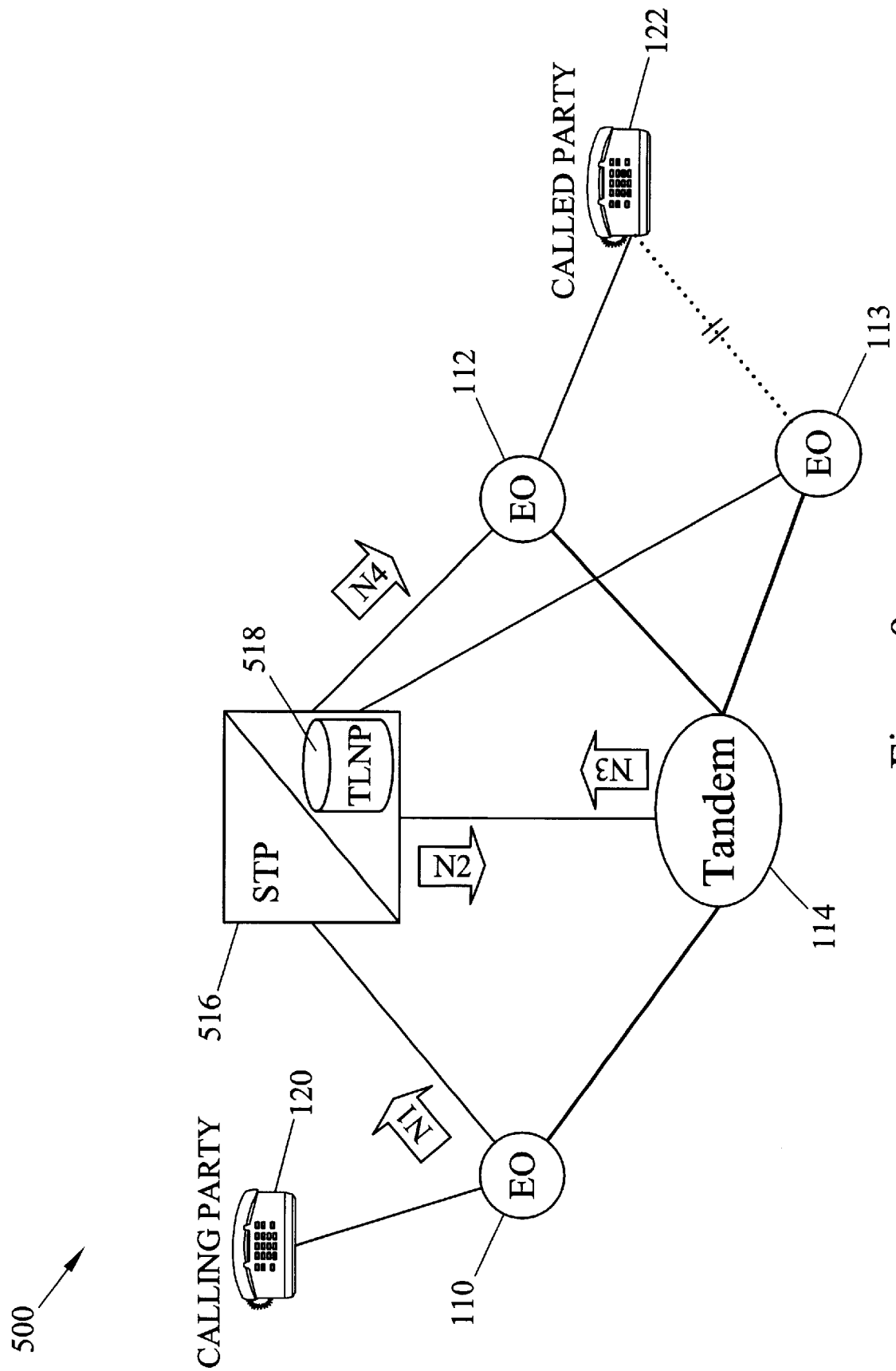
FIG. 9 is a diagram illustrating a network implementation of a triggerless number portability routing node of the present invention and signaling message flows associated therewith.

Shown in FIG. 9 is a simplified network diagram that generally illustrates a sample call flow associated with a triggerless ported number call setup scenario. It will be appreciated that FIG. 9 includes a telecommunications network, generally indicated by the numeral 500. Telecommunications network 500 is further comprised of a number of discrete network elements and communication terminals, many of which were presented in FIG. 1. More particularly, of those components previously described in FIG. 1, network 500 includes the originating End Office (EO) 110, the recipient terminating EO 112, the donor terminating EO 113, the tandem office 114, the Calling Party terminal 120, and the Called Party terminal 122. Network 500 also includes a TLNP routing node 516, which is similar in form and function to the first embodiment of the present invention described herein. As such, TLNP routing node 516 contains an internal, integrated TLNP database 518.

In this example, it is assumed that the called party 122 has had local phone service ported from a service provider that owns EO 113 to a service provider that owns EO 112. Consequently, it is implied that the service responsibility for called party 122 was transferred from the donor EO 113 to the recipient EO 112 at some point in the past. As such, EO 112 is now assumed to service called party 122. Once again, the diagram shown in FIG. 9 is intended to generally illustrate the flow of SS7 call setup messages in response to the placement of a telephone call from Calling Party 120 to the ported Called Party 122. FIG. 10 provides sample ISUP IAM message contents before and after the TLNP processing that is performed in the example scenario presented in FIG. 9. In FIG. 10, the left hand column indicates the various fields in an IAM message. The central column illustrates exemplary field values before LNP processing, and the right hand column illustrates exemplary field values after LNP processing.

It will be appreciated that the fields shown in FIG. 10 are a subset of the fields contained within a typical ISUP IAM message, and consequently FIG. 10 is not intended to represent a complete ISUP IAM message. More particularly, FIG. 10 includes sample Originating Point Code (OPC), Destination Point Code (DPC), Calling Party Number Length (CgPA:NL), Calling Party Address (CgPA:ADD), Called Party Number Length (CdPA:NL), Called Party Address (CdPA:ADD), Called Party Numbering Plan (CdPA:NP), Called Party Nature of Address Indicator (CdPA:NAI), Translated Call Number Indicator (TCNI), Generic Address Parameter (GAP), and Jurisdiction Information Parameter (JIP) values.

As indicated in FIG. 9, in response to call initiating activity performed by Calling Party 120, the originating End Office 110 formulates and launches an ISUP IAM message N1 into the SS7 signaling network. In this example, it is assumed that the EO 110 has been assigned an SS7 network address or point code (PC) of 1-1-0, while TLNP routing node 516 has a PC of 2-2-0, and tandem office 114 has a PC of 3-3-0. It is further assumed that the recipient EO 112 has an assigned Location Routing Number (LRN) of 9193801111, that Calling Party 120 has been assigned a phone number of 9194671234 and Called Party 122 has a phone number of 9194605500. As such, it will be appreciated from FIG. 10 that ISUP IAM message N1 includes calling and called party information associated with Calling Party 120 and Called Party 122, respectively. It will also be appreciated that the OPC of the message N1 is set to 1-1-0, while the DPC is set to 3-3-0.

Returning now to the message flow shown in FIG. 9, ISUP IAM message N1 is received by the TLNP routing node 516 and subsequently examined to determine whether TLNP processing is required. In this case, TLNP translation service is indicated and an LNP database lookup is performed by the TLNP sub-system 518, based on the CdPA:ADD value of 9194605500. A match is found in the LNP database, and an LRN value of 9193801111 is returned, as indicated in the sample LNP database of FIG. 4. It should be appreciated that the LRN value returned by the LNP database corresponds to that of the recipient EO 112 which services the Called Party 122. Consequently, several modifications are the made to the initial ISUP IAM MSU, resulting in a new ISUP IAM message N2. As indicated in FIG. 10, there are a number of key differences between the N2 message and the original ISUP IAM message N1. The CdPA:ADD field of the N2 message has been changed from the previous N1 value of 9194605500 to reflect the LRN value, 9193801111, returned by the LNP database lookup operation. The Translated Call Number Indicator (TCNI) field has also been changed from the previous N1 value of 0 to the new value of 1. Two new parameters have also been added and assigned values in the N2 message. The GAP:ADD field has been set to original N1 CdPA:ADD value of 9194605500, while the JIP:ID parameter has been set to the first six digits of the N1 CgPA:ADD value, 919467.

It should be appreciated that LNP response message N2 contains a Location Routing Number (LRN) associated with the recipient EO 112. TLNP routing node 516 subsequently MTP routes message N2 to tandem office 114. Tandem office 114 examines and processes the message and formulates a message N3, the contents of which are not particularly relevant to a discussion of the present invention. Message N3 is sent back to TLNP routing node 516, which in turn MTP routes the message to the recipient EO 112 as message N4.

Once again, those skilled in the art of telecommunication network operations will appreciate that additional call setup and teardown messages, not shown in FIG. 9, may be necessary to administer a complete a telephone call between the calling party 120 and the called party 122. The signaling message flow shown in FIG. 9 is intended only to generally illustrate a TLNP translation process of the present invention. As these additional signaling messages are not particularly relevant to the design and operation of the present invention, a detailed discussion of call setup and teardown procedures in an SS7 telecommunications network is not provided herein.

Figure 1:
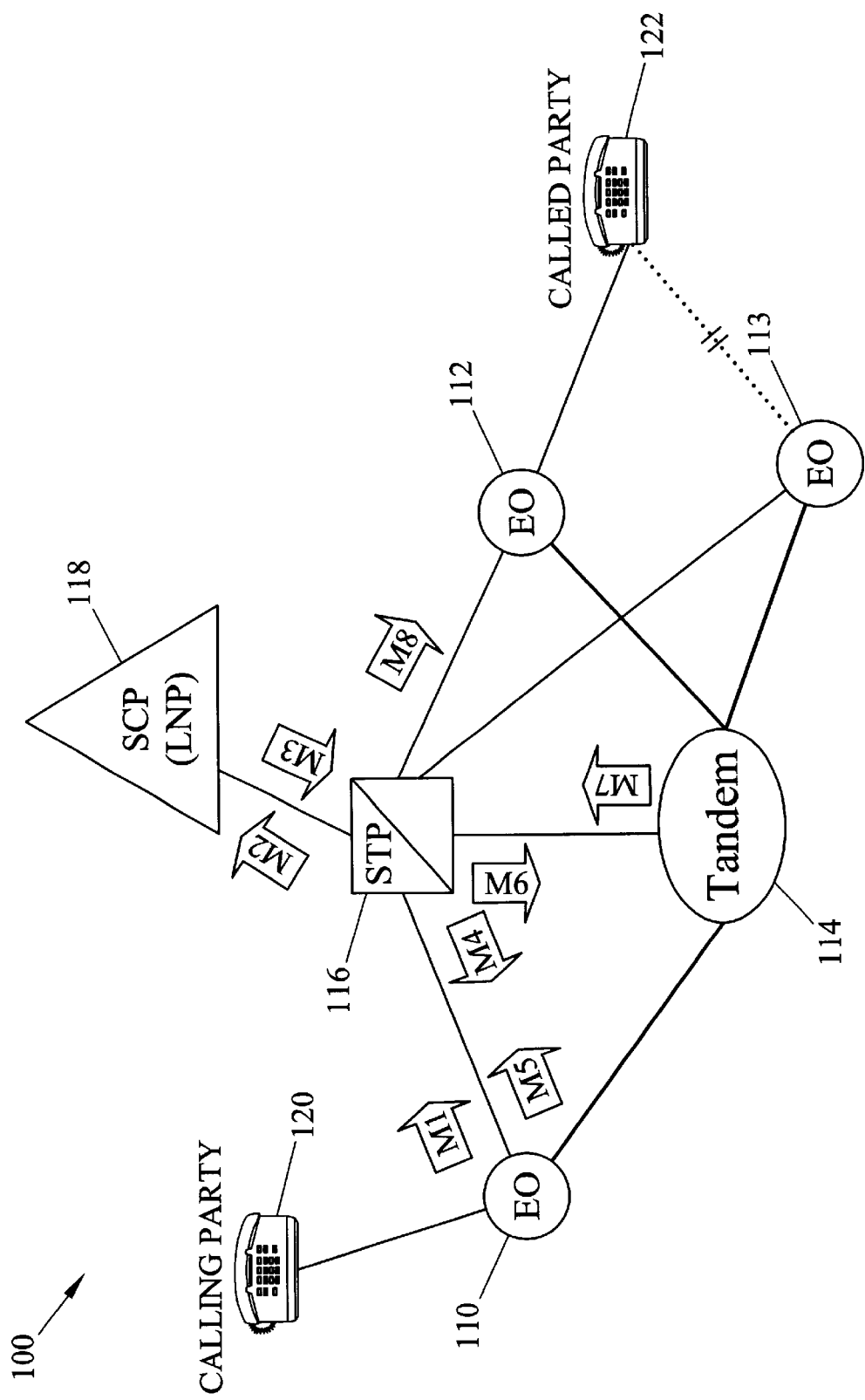
FIG. 1 is a network diagram illustrating a conventional LNP solution and associated signaling message flows.

The triggerless number portability processing illustrated in FIG. 8 can be contrasted with conventional triggered number portability processing illustrated in FIG. 1. First, because TLNP routing node 516 determines whether number portability processing is required, originating end office 110 need not have a number portability processing trigger as required by the system in FIG. 1. This is a significant advantage, since it is burdensome to program multiple end offices to trigger on ported numbers.

Another advantage provided by the TLNP routing node of the present invention is a decreased number of messages for performing number portability processing. For example, eight messages are required to deliver the call setup message to called party end office 112 illustrated in FIG. 1, while only four messages are required in FIG. 9. This decreased message flow provided by embodiments of the present invention decreases call setup time and network congestion.

It will be understood that various details of the invention may be changed without departing from the scope of the invention. Furthermore, the foregoing description is for the purpose of illustration only, and not for the purpose of limitation—the invention being defined by the claims.

What is claimed is:

1. A triggerless number portability routing node, the routing node comprising:
   (a) a communication module for receiving a first call setup message from a first end office associated with a calling party over a first communications network, the first call setup message including a first called party address and a ported number translation indicator;
   (b) a stop action process for examining the ported number translation indicator to determine whether number portability processing is required and, in response to determining that number portability processing is required, encapsulating the first call setup message in a first packet;
   (c) a number portability database containing packet routing instruction records associated with ported subscribers; and
   (d) a number portability process for receiving the first packet, extracting the first called party address from the first packet, performing a lookup in the number portability database using the first called party address to obtain a second called party address associated with a second end office, and modifying the first call signaling message to include the second called party address.

2. The routing node of claim 1 wherein the first call setup message is a Signaling System 7 (SS7) signaling message.

3. The routing node of claim 2 wherein the Signaling System 7 (SS7) signaling message is an ISDN User Part (ISUP) message signal unit (MSU).

4. The routing node of claim 1 wherein the first call setup message is an initial address message.

5. The routing node of claim 1 wherein the first communications network is a Signaling System 7 (SS7) network.

6. The routing node of claim 1 wherein the first communications network is an Internet Protocol (IP) network for carrying IP encapsulated SS7 messages.

7. The routing node of claim 1 wherein the communication module is a Signaling System 7 (SS7) Link Interface Module (LIM) adapted to receive SS7 messages over an SS7 signaling link.

8. The routing node of claim 1 wherein the communication module is an Internet Protocol (IP) Database Communication Module (DCM) adapted to receive IP-encapsulated SS7 messages over an IP network.

9. The routing node of claim 1 wherein each record in the number portability database includes a Signaling System 7 (SS7) Location Routing Number (LRN).

10. The routing node of claim 1 wherein each record in the number portability database contains an Internet Protocol (IP) destination address and port number.

11. The routing node of claim 1 wherein the stop action process is adapted to encapsulate the first call setup message in a signaling connection control part (SCCP) packet.

12. The routing node of claim 11 wherein the stop action process is adapted to set an originating point code value in the SCCP packet to a point code of the routing node, an SCCP called party routing indicator value in the SCCP packet to SSN, and a called party subsystem number value in the SCCP packet to a number portability subsystem number of the routing node.

13. The routing node of claim 1 wherein the number portability process is adapted to replace the first called party address with the second called party address in the first call setup message.

14. The routing node of claim 1 wherein the second called party address is a Location Routing Number (LRN) associated with the second end office.

15. The routing node of claim 1 wherein the first call setup message includes a generic address parameter address field having a first address value and the number portability process is adapted to replace the first address value with the first called party address.

16. The routing node of claim 1 wherein the first call setup message includes a Translated Call Number Indicator field having a first value and the number portability process is adapted to set the first value to one.

17. The routing node of claim 1 wherein the first call setup message includes a jurisdiction indication parameter having a first value and the number portability process is adapted to set the first value to at least a portion of the first called party address contained in the first call setup message.

18. The routing node of claim 1 wherein the number portability database is contained within the routing node.

19. The routing node of claim 1 wherein the number portability database is located on an external database server that is communicatively coupled to the routing node.

20. The routing node of claim 1 wherein the number portability database includes a high-speed, random access memory (RAM) for storing the packet routing instruction records.

21. The routing node of claim 1 wherein the number portability database includes a high speed, optical disc storage medium for storing the packet routing instruction records.

22. A method for routing a data packet associated with a ported subscriber in a communications network, the method comprising the steps of:
   (a) receiving a data packet from a communication network;
   (b) determining whether the data packet contains a call setup message;
   (c) in response to determining that the data packet includes a call setup message, performing a lookup in a number portability database using key information contained in the data packet;

(d) modifying contents of the data packet to incorporate one or more number portability routing instructions returned by the number portability database lookup; and (e) transmitting the modified data packet into the communication network.

23. The method of claim 22 wherein the data packet is a Signaling System 7 (SS7) signaling message.

24. The method of claim 23 wherein the Signaling System 7 (SS7) signaling message is an ISDN User Part (ISUP) message signal unit (MSU).

25. The method of claim 24 wherein ISUP MSU contains an initial address message.

26. The method of claim 22 wherein the communications network is a Signaling System 7 (SS7) network.

27. The method of claim 22 wherein the communications network is an Internet Protocol (IP) network carrying IP encapsulated SS7 messages.

28. The method of claim 22 wherein determining whether the data packet contains a call setup message includes determining whether the data packet is an SS7 ISDN User Part initial address message.

29. The method of claim 22 wherein the key information used in the number portability database lookup includes address identification information associated with a called party.

30. The method of claim 29 wherein the address identification information includes the information contained in a Called Party Address (CdPA:ADD) field of the data packet.

31. The method of claim 22 wherein the number portability routing instruction information returned by the number portability database is a Location Routing Number.

32. The method of claim 22 wherein the modifying the contents of data packet includes replacing original contents of a Called Party Address (CdPA:ADD) field in the data packet with the routing instruction information returned by the number portability database lookup.

33. The method of claim 22 wherein the routing instruction information returned by the number portability database includes a Location Routing Number (LRN).

34. The method of claim 22 wherein modifying the contents of the data packet includes replacing original contents of a Generic Address Parameter Address (GAP:ADD) field in the data packet with original contents of a Called Party Address (CdPA:ADD) field in the data packet.

35. The method of claim 22 wherein modifying the contents of the data packet includes setting a Translated Call Number Indicator field in the data packet to a value of one.

36. The method of claim 22 wherein modifying the contents of the data packet includes setting a Jurisdiction Information Parameter Identification (JIP:ID) field in the data packet to a value equal to digits extracted from a Calling Party Address (CgPA:ADD) field of the data packet.

37. The method of claim 22 wherein receiving a data packet from a communications network includes receiving a data packet from a first end office associated with a calling party in the communications network and transmitting the modified data packet to a tandem office in the communications network.

38. The method of claim 22 comprising, in response to determining that the data packet includes a call setup message and prior to performing the lookup, encapsulating the data packet in a signaling connection control part (SCCP) message.

39. The method of claim 38 wherein encapsulating the data packet in an SCCP packet includes setting an originating point code value in the SCCP packet to a point code of the routing node, an SCCP called party routing indicator value in the SCCP packet to SSN, and a called party subsystem number value in the SCCP packet to a number portability subsystem number of a routing node.

40. The method of claim 22, wherein modifying the contents of the data packet includes setting a Jurisdiction Information Parameter field to a value for identifying an end office that originated the call setup message.

41. A computer program product comprising computer-executable instructions embodied in a computer-readable medium for performing steps comprising:

(a) receiving a call setup message from a communications network, the call setup message including a first called party address value associated with a first end office;

(b) performing a lookup in a number portability database based on the first called party address value to obtain a second called party address value associated with a second end office; and (c) replacing the first called party address value in the call setup message with the second called party address value.

42. The computer program product of claim 41 comprising, in response to receiving the call setup message and prior to performing the database lookup, encapsulating the call setup message in a signaling connection control part (SCCP) packet.

43. The computer program product of claim 42 wherein encapsulating the call signaling message in an SCCP packet includes setting a Jurisdiction Information Parameter field to a value for identifying an end office that originated that call setup message.

44. The computer program product of claim 41 wherein the call setup message includes a first calling party address value and a first jurisdiction information parameter value.

45. The computer program product of claim 44 comprising modifying the first jurisdiction information parameter value to include at least a portion of the first calling party address value.

46. The computer program product of claim 41 wherein receiving a call setup message includes receiving an ISDN user part (ISUP) message.

47. The computer program product of claim 41 comprising, after replacing the first called party address value with the second called party address value, forwarding the first call setup message to a tandem switch.

* * * * *